United States Patent [19]
Squires et al.

[11] Patent Number: 5,756,180
[45] Date of Patent: *May 26, 1998

[54] FLOCKED FABRIC SUITABLE AS OUTERWEAR

[76] Inventors: William J. Squires, 441 Canal St., Stamford, Conn. 06902; William T. Squires, Jr., 26 E. Hunting Ridge Rd., Stamford, Conn. 06903

[*] Notice: The term of this patent shall not extend beyond the expiration date of Pat. No. 5,543,195.

[21] Appl. No.: 692,143

[22] Filed: Aug. 5, 1996

Related U.S. Application Data

[63] Continuation-in-part of Ser. No. 241,607, May 11, 1994, Pat. No. 5,543,195, which is a continuation-in-part of Ser. No. 180,865, Jan. 12, 1994, abandoned.

[51] Int. Cl.⁶ .................. B32B 3/02; B32B 33/00; B05D 1/14; B05D 1/16
[52] U.S. Cl. .................................... 428/90; 428/95
[58] Field of Search .................................. 428/90, 95

[56] References Cited

U.S. PATENT DOCUMENTS

| | | | |
|---|---|---|---|
| D. 297,596 | 9/1988 | Marquart, Sr. | 428/919 |
| D. 301,289 | 5/1989 | McIlhinney | 428/919 |
| D. 326,363 | 5/1992 | Cooper | 428/919 |
| 2,231,995 | 2/1941 | Glidden et al. | 428/90 |
| 3,171,484 | 3/1965 | Thal | 428/90 |
| 3,262,128 | 7/1966 | Morgan et al. | |
| 3,616,136 | 10/1971 | Endrenyi, Jr. | 428/90 |
| 3,849,236 | 11/1974 | Bourdon | 161/64 |
| 3,917,883 | 11/1975 | Jepson | 428/90 |
| 3,969,560 | 7/1976 | Lewis et al. | 428/90 |
| 4,095,940 | 6/1978 | Weingarten | 428/919 |
| 4,122,219 | 10/1978 | Fickeisen et al. | 428/90 |
| 4,287,243 | 9/1981 | Nielsen | 428/919 |
| 4,294,577 | 10/1981 | Bernard | 8/448 |
| 4,362,773 | 12/1982 | Shikinami | 428/90 |
| 4,417,291 | 11/1983 | Miklos et al. | 360/133 |
| 4,482,593 | 11/1984 | Sagel et al. | 428/90 |
| 4,656,065 | 4/1987 | Yacovella | 428/919 |
| 4,668,323 | 5/1987 | Lenards et al. | 156/242 |
| 4,781,959 | 11/1988 | Gottlieb | 428/919 |
| 4,895,748 | 1/1990 | Squires . | |
| 5,059,452 | 10/1991 | Squires | 428/90 |
| 5,126,182 | 6/1992 | Lumb et al. | 428/90 |
| 5,543,195 | 8/1996 | Squires et al. | 428/90 |

FOREIGN PATENT DOCUMENTS

| | | | |
|---|---|---|---|
| 63-28984 | 2/1988 | Japan | 428/90 |
| 6506056 | 11/1965 | Netherlands . | |

OTHER PUBLICATIONS (1) Polar fleece knit fabric (2) Polycotton woven fabric (3) Polycotton brushed fabric (4) Flocked polyurethane foam fabric with flattened flock fibers.

Abend, Julius; *Partners Score A Bull's Eye With Huntcloth*; May 1992; p. 14; Bobbin; vol. 33, No. 9.

*Primary Examiner*—Terrel Morris
*Attorney, Agent, or Firm*—Cobrin Gittes & Samuel

[57] ABSTRACT

A fabric used as outerwear having a stabilized substrate, an adhesive and flock adhered to the substrate with the adhesive. The adhesive is dried and cured, preferably aerated. A waterproof film may be applied either to the substrate or to a lining adjacent the substrate. The flock may be flattened into a laid down condition.

16 Claims, 2 Drawing Sheets

| PRINT | 6 |
|---|---|
| FLOCK | 5 |
| ADHESIVE | 4 |
| SUBSTRATE | 2 |
| FILM | 8 |

FIG. 5

| PRINT | 6 |
| --- | --- |
| FLOCK | 5 |
| ADHESIVE | 4 |
| SUBSTRATE | 2 |
| AIR SPACE | 9 |
| LINING | 7 |
| FILM | 8 |

FIG. 6

| TEFLON | 20 |
| --- | --- |
| PRINT | 6 |
| FLOCK | 5 |
| ADHESIVE | 4 |
| PRE-COAT ADHESIVE | 21 |
| SUBSTRATE | 2 |
| TEFLON | 20 |

FLOCKED FABRIC SUITABLE AS OUTERWEAR

CROSS-REFERENCE TO CO-PENDING PATENT APPLICATIONS

This is a Continuation-In-Part of U.S. patent application Ser. No. 08/241,607, filed May 11, 1994, now U.S. Pat. No. 5,543,195 which is a Continuation-In-Part of U.S. patent application Ser. No. 08/180,865, filed Jan. 12, 1994, now abandoned.

BACKGROUND OF THE INVENTION

The present invention relates to a flocked fabric that retains characteristics typically attributed to fabrics used in upholstery and yet is suitable for outdoor use as a worn garment. When used as hunter's outerwear, the fabric is quiet, camouflaged by its colorful pattern, wind-resistant, water-resistant, abrasion-resistant, drapeable, burr retention resistant and preferably treated with a scent-inhibiting chemical. As a result, the fabric serves as a washable apparel item, which will neither be seen, heard nor smelled by prey. By flattening the flock directionally into a laid down condition and thermally setting the flock in that condition, the laid down flock provides a natural water repellent and substantially flat surface onto which may be printed a colorful pattern or solid color. Solid color may be achieved by stock dyeing flock and/or piece dyeing. The colorful pattern or solid color appears crisp and well-defined without distortion.

Transfer printing onto flattened flocked surfaces is known in the upholstery trade where the flocked surfaces are atop a woven backing. The relatively harsh backing is unsuitable for apparel because it is not particularly drapeable. Further, the harsh backing is rough to the touch and therefore noisy in that it rustles appreciably if rubbed against itself or other objects. If outerwear contained such backing and were worn by hunters trying to elude animal prey, such a rustling noise would be detrimental to the hunter's effort at being evasive. It would therefore be desirable to soften such backing or select one less noisy.

Transfer printing onto flocked surfaces for blankets and apparel has been revealed by earlier patents of one of the present inventors, that is, U.S. Pat. Nos. 4,895,748 and 5,059,452, both of whose contents are incorporated herein by reference. However, those patents teach about foamed knitted fabrics, such as those which include a flocked polyurethane foam with flattened fibers which are color printed. Such foamed knitted fabrics have excellent insulating properties but have relatively poor abrasion resistance. The present inventors have made some observations.

In general, foam has a low abrasion point and has been known to crumble when exposed to extremes of humidity and heat over extended periods of time. Further, foam may break down when subjected to strong caustic chemicals or dry cleaning.

When used in outerwear, the foam should be secured to a stretchable backing, such as a knitted substrate, to improve the stretch of the fabric to make use of its comfort characteristics. Foam is somewhat permeable and therefore limited in its ability to provide wind-resistance. Foam retains water that renders a fabric somewhat bulky and less drapeable than is the case without it.

A hunter's outerwear plays an important role in the success or failure of the hunt. Hunters do not want to be seen, heard or smelled by their prey. Hunters prefer their outerwear to blend in with their surroundings rather than stand out.

If the appearance of hunter's outerwear contrasts markedly with the environment, the prey may notice the contrast and become startled and dart away. For this reason, a camouflage pattern is preferred to blend in with the surroundings. Depending upon the type of fabric to which the pattern is applied, the realism, coloring and crispness in definition of the pattern will vary. Ideally, the surface of the fabric should not distort the pattern or otherwise take away from the realism of the camouflage.

For instance, if the fabric is knitted or woven, the texture of its surface structure will distort the camouflage pattern or otherwise take away from the realism, crispness or definition. A fabric composed of plastic, on the other hand, has a surface structure which would not distort the pattern.

Unfortunately, many fabrics whose surface structure will not distort color patterns are noisy in that as the hunter moves about or approaches prey, the fabric makes noises which may scare away the nearby prey within earshot.

For instance, the conventional bright orange plastic raincoat poncho may satisfy the visibility level for orange color required for safety purposes outdoors and further is waterproof. Nevertheless, such a poncho is too noisy for most hunters. It does a hunter little good to appear invisible to prey if the outerwear is so noisy as the hunter approaches that the prey scares off. Indeed, prey may frighten based on what they hear rather than on what they actually see.

Knitted or brushed woven fabrics, on the other hand, are more quiet as the hunter moves about. This is attributed to their surface structure being soft to the touch, rather than rough, so that when rubbed against itself, little if any noise is heard. Nevertheless, the surface structure of the knitted or brush woven fabric, as mentioned previously, distorts the realism of the pattern printed on it.

A nuisance associated with the wearing of conventional outerwear is that the fabric material may pick up burrs, leaves, sticktights, thistles, plant-life originated "hitchhikers", etc. in the outdoors which cling or stick to the fabric (the matter picked up will collectively be referred to hereafter as "burr(s)"). As a consequence, the fabric becomes noisy; removing the burrs from the fabric is a time-consuming task, because each burr must be pulled off the outerwear individually. The task becomes more difficult to accomplish while in the outdoors because the outerwear is being worn at the time and, while the wearer could take time out to clean the outerwear of the burrs if so motivated, inevitably more burrs will be picked up again. Thus, pulling out the burrs individually is a never ending, time consuming and frustrating process to perform. To a hunter, burr retention is more than just a nuisance; any additional noise generated by the outerwear, such as that attributed to the retention of burrs, increases the risk of frightening prey that are within earshot.

Untreated outerwear, when worn, eventually picks up the smell or body odor of its wearer. If downwind of the hunter, prey, which has a keen sense of smell, may pick up the scent given off by such outerwear. Thus, even if the outerwear is quiet and camouflaged, such precautions against being noticed by the prey are defeated if the hunter's scent is picked up by the prey from the outerwear.

Scent inhibiting chemicals for fabrics are available commercially, such as that sold under the trademark ULTRAFRESH™. Therefore, the fabric of the outerwear should be treated with such scent inhibiting chemicals. In this manner, the scent retention problem in outerwear goes away. When a quiet fabric is so treated and camouflaged, the wearer is neither seen, heard or smelled downwind by the prey.

Of course, the outerwear should also be made for comfort. In this connection, the outerwear fabric preferably should be drapable, washable, water resistant, wind resistant, abrasion resistant and burr retention resistant. Further, the fabric should be pleasant to the touch and not be bulky. Also, the fabric should not shrink excessively when subjected to a commercial dyeing process or home wash and dry, but the outerwear should be moisture permeable and breathable.

Tests have been developed to determine the extent to which a fabric is deemed water resistant, water repellant, abrasion resistant and stiff. The American National Standard AATCC test method 35-1994, as set forth on pages 89–90 of the AATCC Technical Manual, exemplifies a water resistance test. Basically, a fabric test specimen, backed by a weighed blotter, is sprayed with water for five minutes under controlled conditions. The blotter is reweighed to determine the amount of water which has leaked through the specimen during the test. This test is an accepted indicator of the resistance of fabrics to the penetration of water by impact, and thus can be used to predict the probable rain penetration resistance of fabrics.

Also AATCC Test Method 42-1989 is used as an impact penetration test to measure water resistance. Basically, 500 milliliters of water is poured from a height of 2 feet through an impact penetration tester against the surface of the test specimen, which had a blotter behind it that had been weighed prior to testing. The blotter is then removed and reweighed. The increase in the weight of the blotter is calculated. The lower the numerical weight calculation of the increase, the better the water resistance. The best result is 0.0, which signifies no penetration of the water to the blotter.

A hydrostatic pressure test is also used to measure water resistance according to AATCC Test Method 127-1989. An 8"×8" fabric test specimen is placed in a hydrostatic pressure tester. Water at about 80 degrees Fahrenheit is placed on top of the specimen and the height of the water is raised 1 centimeter per second until three droplets of water can be seen on the underside of the specimen. The height of the water is measured; the higher the height, the better the water resistance.

A suitable measure of water repellency is a spray test according to AATCC Test Method 22-1989. Basically, 250 milliliters of distilled water is poured through an AATCC spray tester over each fabric sample. An AATCC spray tester is a 6" glass lab funnel with a spray head attached by a ⅛" rubber tubing. The funnel is held by a metal ring on a ring support six inches above the sample, which is mounted at a 45 degree angle with the use of a metal embroidered hoop. Results are obtained by observing an AATCC spray test rating chart against the tested sample. The higher the rating number, the better the water repellency.

Accepted abrasion tests are the taber test according to ASTM D-3884-92, which tests the abrasion resistance when the fabric is dry and when the fabric is wet, and the dry scuff test. These tests provide an indication as to the likelihood of the fabric abrading during normal wear and tear and during washing. The scuff test employs an apparatus having a weighted arm that presses a metal disc into the face side of fabric. The face side of a fabric, which is supported over a pad of latex foam rubber is rubbed under controlled conditions, by the edge of the metal disc. The test is intended to assess the tendency of all types of cut or non-loop pile upholstery to lose substantially complete lengths of pile from the surface of the fabric. To the extent that this tendency generally requires a harsh abrasive force from a relatively keen edged object, it often relates to minor unspecified abuse of the upholstery.

The taber test according to ASTM D 3884-92 involves abrading a fabric specimen using rotary rubbing action under controlled conditions of pressure and abrasive action. The test specimen, mounted on a platform, turns on a vertical axis, against the sliding rotation of two abrading wheels. One abrading wheel rubs the specimen outward toward the periphery and the other inward toward the center. The resulting abrasion marks form a pattern of crossed arcs over an area of approximately 30 $cm^2$. Resistance to abrasion is evaluated by various means.

A suitable fabric stiffness test is done pursuant to Method 5206 (Jul. 20, 1978) according to the Federal Test Method Standard No. 191 A. A one inch wide sample of fabric is slid toward the edge of the testing apparatus until one end drops to a 4½ degree angle. The distance of the hanging portion over the edge is measured. The longer the distance measured, the stiffer the sample.

Another suitable stiffness test is done in accordance with a deflection test, in which a 1½" strip in the warp direction is cut on the strip cutter from a random area of the coated or uncoated material, avoiding a cut too close to either edge. The test sample should be on 0" to 10" full width strip from the mill or master roll. Using a 2" platform on a test bench or desk, place a ruler on the desk top touching the base of the platform on one end. Take the 8"×1½" strip and place it coated or uncoated side up on the top of the platform. If coated, peel the release liner from the adhesive, being careful not to bend or distort the coated substrate. For either coated or uncoated material, slide the strip over the ruler end of the platform. Pressing it flat insures that the deflection distance is at its maximum and that the test is accurate. When the leading edge of the strip touches the ruler, read and record the number of inches. This is the deflection distance. The result should be compared to a standard or the historical specimen material.

The outerwear may be exposed to extremes of outdoor temperatures such as temperatures below the freezing point of water. Such frigid temperature conditions may occur unexpectedly and rapidly in some wilderness areas either during the night or from sudden wind chill in mountainous areas. Preferably, the constituents of the flocked outerwear should withstand such temperature extremes without becoming stiff or otherwise causing discomfort to the wearer while moving about.

Many conventional thin fabrics, with color printed upon, normally bleed the colors through, making it commercially impractical to print on the bled through side. Examples of such fabrics include woven polycotton, which is used in outerwear for the hunting trade. Thicker fabrics can be used that allow printing on both sides without bleeding the colors through, but such fabrics are obviously heavier, bulkier and generally less cost competitive to use in the mass production of outerwear than thinner fabrics.

It would therefore be desirable to provide a lightweight outerwear fabric which helps the hunter from being seen, heard or smelled by prey. It would also be desirable to provide an outerwear fabric useful for other applications, such as rainwear or for use at outdoor sporting events and activities, and which provides the outward appearance of distortion-free color crispness and yet is abrasion resistant and washable. It would further be desirable to employ a fabric that lends itself to color printing on both the front and back without the color bleeding through, and yet allowing the fabric substrate itself to be relatively thin.

SUMMARY OF THE INVENTION

The present invention relates to a flocked fabric having a substrate in a stabilized condition, flock fibers and an adhesive adhering the flock fibers to the substrate. The adhesive is in a dried and cured condition. The flock fibers have an embedded portion within the adhesive, a protruding portion protruding out of the adhesive, and a bent portion between the embedding and protruding portions. The protruded portion is in a flattened and laid down condition to provide a substantially flat surface and arranged to lie on at least one of the adhesive and neighboring ones of the flock fibers. The stabilized condition is such that the substrate is prevented during flexing from stretching by an extent that would cause the adhesive to break apart.

The fabric is suitable for the manufacture of garments worn outdoors, such as sportswear, rainwear and hunter's outerwear. The substrate, or a combination of the substrate and film, may be stabilized, which means it is sufficiently resistant to stretching that the adhesive will not break apart. Indeed, the film, if applied appropriately to the substrate such as through lamination, may provide the needed stabilization for the adhesive.

BRIEF DESCRIPTION OF THE DRAWING

For a better understanding of the present invention, reference is made to the following description and accompanying drawings, while the scope of the invention is set forth in the appended claims.

FIG. 5 is a schematic cross-section of the flocked fabric as in FIG. 2, except showing a lining between the substrate and the film.

FIG. 6 is a schematic cross-section of the flocked fabric of FIG. 1, but showing additional layers.

DESCRIPTION OF THE PREFERRED EMBODIMENT

Figure 1:
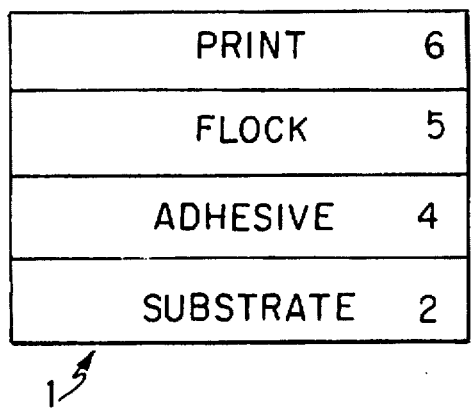
FIG. 1 is a schematic cross-section of the flocked fabric in accordance with the present invention.

FIG. 1 shows the fabric in accordance with the invention being in the form of a woven substrate 2 to which is adhered flock 5 by an acrylic, polyurethane, latex or other type of adhesive 4. The flattened flock 5 is thermally set into a laid down and substantially flattened and, if long enough, entangled state. The transfer printing process leaves a layer of colored dry ink print 6 on the flattened flock 5. The substrate 2 is preferably made of a polycotton blend, woven polyester, woven polypropylene material or nylon. A precoat adhesive may be applied and dried to fill interstices of the substrate. Thereafter, the adhesive 4 is applied and then flock is adhered to the substrate with the adhesive 4.

Figure 2:
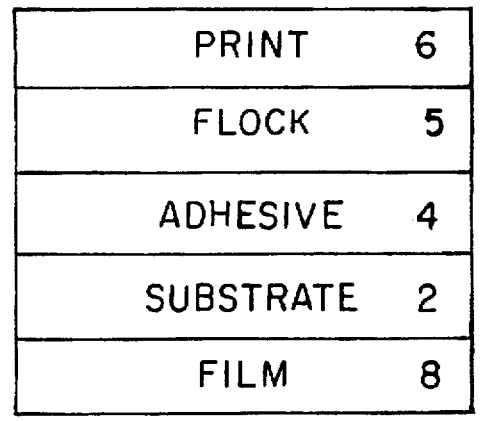
FIG. 2 is a schematic cross-section of the flocked fabric as in FIG. 1, but further shows a waterproof film laminated or coated onto the substrate.

The woven polyester and woven polypropylene are examples of suitable materials for the substrate 2 because they are hydrophobic, i.e., they do not appreciably absorb moisture and are well suited for lamination with waterproof breathable films, such as Gortex™ or Dry-Plus™ or Vapex™. With such materials forming the fabric, moisture will not be retained on the inside of the fabric. FIG. 2 schematically illustrates a waterproof film 8 applied to the substrate 2. The film 8 may be breathable or non-breathable. An outer coat of Teflon™ finish may be applied to the flock to enhance water resistance.

The substrate may be a woven polycotton (such as 65/35) or substituted by a hydrophobic material such as 100% woven polyester or 100% polypropylene. Any blend of such materials may be employed. Instead of nylon, the flock may be composed of rayon or other conventional flock materials or any combination thereof.

Figure 3:
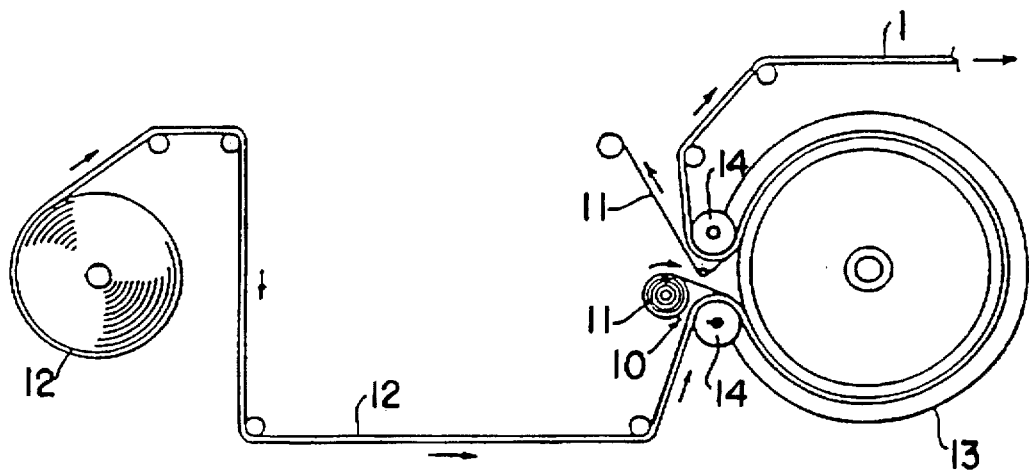
FIG. 3 is an elevational schematic view of the flocked fabric being subjected to a dry ink transfer process in accordance with the present invention.

Transfer printing onto this directionally flattened flock surface, as carried out with a print transfer machine which is depicted in FIG. 3, provides a surprisingly crisp and clearly defined pattern whose colors appear as vivid and intense as on the transfer paper from which the pattern came. The flock fibers are laid down and directed in predominantly one direction to increase abrasion resistance and burr-retention resistance. It also guides water to run off the flock. This run off may simulate a shedding effect in the sense of a stream of water flowing off an incline. While substantially flat, the flock fibers may not be perfectly flat but inclined because their free ends rest on neighboring flock or adhesive. The flock, which has an end fixed in the adhesive, may bend to reach its laid down condition. This may involve causing the flock to lie on adjacent flock or adhesive to provide the flat surface.

A transfer printing machine presses the flock under elevated temperatures onto the adjacent adhesive and or other flock, thereby bending the flock in the process preferably to define an angle of inclination of 10 degrees or less from the substrate, preferably horizontal. The adhesive should be cured before the fabric is fed into the print transfer machine for subsequent directional flattening of the flock fibers. The flock fibers may or may not deform under the elevated pressures and temperatures imparted by the print transfer machine. The memory of the flock fibers changes so that they no longer have a tendency to return to the erect condition but instead return to a flattened and laid down condition.

FIG. 3 illustrates a dry ink transfer process used to flatten the flock fibers and transfer dry ink onto the flock. A pattern or solid color 10 is printed onto special print paper 11. The print paper 11 and flocked fabric 12 are fed together between rollers 13, 14 in a conventional screen transfer printing machine. The pattern or solid color 10 is against the flock fibers. At least one of the rollers is heated at a temperature of approximately 400 degrees Fahrenheit and pressure is applied by the rollers against the fabric and sheet for approximately 30 seconds to enable the transference of the dry ink of a multi-colored print pattern or solid color 10 onto the flock. Instead of rollers, any type of pressure elements, such as pressure plates, could be used.

The process of screen transfer printing involves first making screens for each color to be print transferred, then printing onto paper through the screens, and finally running the paper with the fabric through a print transfer machine, such as a rotary screen print transfer machine of Stork under model numbers TC 101 and TC 131 or of Kannegieser. Alternatively, conventional rotogravure printing machines may be employed for printing a pattern in accordance with the invention. Both the flock and substrate may be dyed a solid color in advance of the flock flattening and either in addition to or in lieu of the transfer or rotogravure printing.

To make the pattern for use in transfer printing, paper is inked (one ink color at a time) and then the completed pattern on the paper is transferred onto the fabric in a print transfer machine which thermally sets the flock into a flattened state.

The preferred embodiment of the invention employs fiber (preferably 1 to 3 denier dull nylon or polyester fiber and 0.025 to 0.080 inches or other fiber lengths), which is adhered to a substrate that is a polycotton blend or 100 percent polyester with an acrylic based and/or polyurethane adhesive (two coats) and/or blends of such adhesives. The finer the denier of the flock fibers and the shorter and thinner the fibers, the softer the suede-like feel of the fabric after flattening the flock fibers.

Fine flock (1 to 2 denier) with short fiber length (0.025 to 0.05 inches) provide a flatter surface when flattened than coarser flock (3 denier and up) with longer fiber lengths so that a transferred print looks more distortion-free on the flattened surface. In view of the selection of fine denier and short fiber length, the resulting compactness in combination with proper adhesive and substrate selection offers superior resistance to color bleed through.

The selection of flock size affects characteristics of the fabric. If the denier is too fine, the fibers are short so that pressing them under elevated temperatures and pressures merely crushes their ends without necessarily bending them over to form a flat surface. If the denier is too coarse, the fibers are long so that pressing them under elevated temperatures and pressures causes them to entangle and, because of their larger dimension, lessens the density of flock fibers on the fabric. The greater the density and meshing of the flock fibers flattened into a laid down condition, the more water resistant the fabric may be expected to be, because the laid down fibers act as a barrier against water penetration. For this reason, the preferred fiber denier is 1 to 3 to provide the desired density.

The inventors have observed that when some adhesives are exposed to outdoor subfreezing temperatures such as temperatures below 15 degrees Fahrenheit, the outerwear to which such adhesives are applied may stiffen. Such stiffening may cause some discomfort to the wearer, as well as render the outerwear noisy. Bear in mind that frigid temperature conditions come about before sunrise and after sunset in some geographical locations depending upon the season and also may come about quickly due to sudden wind chills as are common in mountainous regions. One way to avoid such fabric stiffening is to select an adhesive that retains its flexibility under such frigid, subfreezing temperatures.

Adhesives may be aerated to a desired amount by Spectro-coating Corporation of Leominster Mass. Although this company is not an adhesive manufacturer, it has worked with an adhesive manufacturer, American Finish, to develop a suitable a suitable cold-flex adhesive that satisfies the following criteria provided by the inventors: suitable for flocking into a woven fabric and for remaining flexible when exposed to outdoor environmental temperatures between 0 and 32 degrees Fahrenheit such that it will not stiffen the fabric under such subfreezing temperature conditions.

The adhesive preferably is aerated to reduce its stiffness when the fabric is to be used as a garment. Of course, if used to construct knapsack, etc., where stiffness is unimportant, the adhesive need not be aerated, which tends to increase its abrasion-resistance over that of garments having aerated adhesives.

Preferably, the aeration may be gradually increased until a desired flexible condition has been achieved, i.e., the fabric is sufficiently drapeable for use as a garment. The stiffness test (Method 5206) may be used to measure drape. However, the aeration level can not be so great that it causes the fabric to fail the taber abrasion tests (wet and dry condition) and the scuff test.

Therefore, there is some degree of trade-off between drapeability and abrasion resistance in determining the appropriate amount of aeration. If the fabric is too stiff despite the aeration, perhaps because the amount of aeration was too low, the stiffness in the fabric may be softened by washing under elevated temperatures. One result from increasing aeration may be that the fabric becomes more breathable, which determines of the rate of water vapor transference through the fabric. The rate of water vapor transfer should be 4500–10,000 grams of moisture per day, preferably 6000–8000 grams of moisture per day.

After the appropriate level of aeration is attained, the adhesive is used to adhere the flock to the substrate and the adhesive is dried and cured in conventional flocking equipment. The fabric has flock adhered to its substrate, with the flock being erect. The fabric is fed into the conventional screen transfer print machine such as that of FIG. 3 to flatten the flock into a laid down condition or any one of the cured adhesive and neighboring flock. As a result, the portion of the flock protruding out of the adhesive lays over, creating a bend between this protruding portion and the portion of the fiber still embedded in the cured adhesive.

If the flock and substrate are dyed a bright fluorescent orange background with a transfer printed black camouflage forefront, the camouflage black furthers the effect of appearing to blend into the natural environment and the fluorescent orange readily satisfies state standards for visibility of hunter outerwear. There is substantially no surface distortion due to the texture or surface structure of the fabric.

If fluorescent orange is not a requirement, the flock and substrate may be dyed a different solid color as desired commercially. Conventionally, the substrate and flock are readily available in a solid color such as white. If some other color is desired, one technique to change the color is to separately dye the substrate the desired color before flocking, dye the flock by itself the same color, and then flock the dyed flock into the dyed substrate.

One way to reduce the number of processing steps for attaining the change in color is to piece dye the flocked substrate itself the desired color, rather than separately dye the flock and substrate in advance before flocking. This has the added advantage of avoiding the need to clean both equipment for dyeing just the flock and equipment for dyeing just the substrate when the job is complete, because only one type of equipment, i.e., that for dyeing flocked substrate, will require cleaning when the job is complete.

By flocking into the woven substrate, flattening the flock fibers by thermally setting them and then piece dyeing the fabric a solid color, the resulting fabric feels less stiff and has a softer hand than before the dyeing, thanks to the elevated temperature and pressure involved in the dyeing process which seem to break down the stiffness in the adhesive and substrate. A typical temperature in such a dyeing process may be in excess of 212 degrees Fahrenheit.

Further, the flocked woven fabric of the invention is drapable, washable, water resistant, burr retention resistant, pleasant to the touch, i.e., comfortable to the wearer. During manufacture, the fabric should have little or no shrinkage when subjected to a commercial dyeing process. Also, the fabric should have little or no shrinkage when subjected to home wash and dry.

Preferably, the fabric is treated with scent inhibiting chemicals, such as that sold under the trademark ULTRAFRESH™, if used for hunting. In this manner, prey which is downwind will not smell the hunter because the treatment finish will not promote the growth of odor causing bacteria. Such treatment is therefore good for concealing the body odor of the wearer.

As a result, a hunter wearing outerwear made from this treated fabric may move about in the wilderness without the outerwear being responsible for the hunter being heard, seen, or smelled by the prey. Further, by dyeing the flock and substrate a bright fluorescent orange color, safety requirements for making hunters visible to fellow hunters in the wild may be satisfied.

The present invention is not limited just to outerwear garments for the hunting trade. The fabric is fine outerwear for use at sporting events and as rainwear if treated chemically for water repellency in a conventional manner. The printed patterns appear distortion free on the flattened flock so as to provide for a crisp and well-defined pattern indicative of the realism of the original on the transfer paper or other medium. Further, the fabric holds up to repeated washings and will essentially not shrink.

By compacting the fibers during the flattening process onto a tightly woven substrate of the fabric, the compactness provides a wind-barrier for the fabric. The more tightly woven substrate provides better wind resistance than one which is knitted and stretchable because of the greater density of the woven material. Also, water repellency dramatically improves thanks to this compactness, as compared to that for knitted or woven fabrics without flock.

The inventors had an independent testing facility, DuPont Specialty Chemicals, test the water repellency of the present invention in comparison to that of other fabrics. Seven fabrics were tested in accordance with the American National Standard AATCC Test Method 35-1994, as previously described, and spray test method #22. Each fabric tested received a spray rating based on visual evaluation. The rating system is based on indicating the percentage to which the fabric remains dry and the rating values are interpreted as follows: 100—no wetting, 90—slight random wetting, 80—slight wetting at spray points, 70—partial wetting of whole surface, 50—complete wetting of top surface but no penetration, 0—complete wetting of top and bottom, i.e., penetration.

Both rain and storm condition tests were conducted in accordance with ASTM standards, with a pass requiring the penetration of less than 1 gm water through the fabric as measured by weighing a blotter mounted under the sample before and after the test.

Typically, the rain condition test is easy to pass with any outerwear fabric treated with Teflon™ coating, but passing the storm condition requires either a good, tightly woven rainwear fabric of a backcoated fabric with a water repellant coating such as those commercialized under the mark Goretex™. The rain test required a column height of water of two feet applied for two minutes, while the storm test required a column height of water of three feet applied for five minutes.

For a napped or pile outerwear fabric, a minimum spray rating of 80 is required to meet the commercial standards required to apply a coating from Teflon™ and advertise that the fabric has been treated with Teflon™. A spray rating of 90 is required with respect to flat woven rainwear.

Two of the fabrics tested were treated with Teflon™ and the remaining five were not treated. Four of the untreated fabrics were: cotton chamois, blue polyester woven, cotton duck, and trebark (polycotton twill). Each received a zero spray rating, which means they would fail both the rain and storm tests. The fifth untreated fabric was that of the present invention, i.e., a flattened flock woven (with 1 to 3 denier flock), which received a spray rating of 50, but also failed the rain test.

As to the treated fabrics, Real tree (polycotton twill) treated with Teflon™ received a 50 spray rating and passed only the rain test. The present invention, i.e., a flattened flock woven (with 1 to 3 denier flock) treated with Teflon™, received a spray rating of 80 and passed both the rain and storm tests.

As should be evident from the test results, treating a fabric with Teflon™ is no guarantee of passing the storm test, yet the treated, flattened flock woven fabric of the present invention did just that. The untreated, flattened flock woven fabric of the present invention surprisingly received the same spray rating as that of the treated Real tree (polycotton twill).

As compared to knitted foamed flocked fabrics, the flocked fabric of the present invention has a woven substrate and is more dense and rigid, doesn't stretch, and provides better abrasion resistance.

The inventors also had Magill Laboratories, Inc., of Slatersville, R.I., conduct the following four tests:

(AATCC 22) water repellency: spray test
(AATCC 42) water resistance: impact penetration test
(AATCC 127) water resistance: hydrostatic pressure test
(Method 5206) stiffness of cloth, drape and flex; cantilever bending method.

Three samples of fabric were tested. Sample 1 was a woven substrate with erect flock fibers but without any water-repellant finish. Sample 2 was a woven substrate with laid-over flock fibers according to the invention, but without water-repellant finish. Sample 3 was a woven substrate treated with laid-over flock fibers and water repellant finish.

The spray test results revealed that sample 1 became completely saturated on both sides; sample 2 became saturated on the surface without penetration by the water; and sample 3 became partially saturated on the surface without penetration by the water.

The test results are tabulated as follows:

| | SAMPLES | | |
|---|---|---|---|
| TESTS, UNIT OF MEASURE | 1 | 2 | 3 |
| Water Repellency Spray Rating (AATCC 22) Average (three trials): | 00 | 50 | 70 |
| Water Resistance, % weight increase (AATCC 42) Average (three trials): | 5.2 | 0.0 | 0.0 |
| Stiffness, inches (Method 5206) Average (three trials): | 2.3 | 2.1 | 1.9 |
| Water Resistance, inches (AATCC 127) Average (three trials): | 12.1 | 24.3 | 25.2 |

These results show that both the water repellency and water resistance improves by laying over the flock into a laid-down condition instead of keeping the flock upright and erect. Adding a water resistance film, such as teflon, improves the water repellency and, to a lesser percentage increase, the water resistance.

According to the hydrostatic test, which measures the water resistance based on the height of the water column placed on top of the fabric specimen being tested until three droplets appear on the underside of the specimen, by laying down the flock fibers instead of keeping them erect and upright, the laid-down flock may tolerate a 100 percent increase in the height of the water column and still provide water resistance, i.e., from 12 inches to 24 inches. Adding a water resistant film coating only enhances the water resistance by allowing about a one inch increase in the water column height. Thus, the primary factor responsible for enhancing water resistance is the laying down of the flock fibers instead of merely adding a water resistance coating.

As can be seen from the stiffness test results, as one end of a fabric specimen defines a 4½ degree angle off an edge, the length of the hanging portion is longer for the laid-over flock specimen versus the upright flock specimen and longer still when the laid-over flock specimen is treated with the water resistant film. This shows a general trend of the drapeability improving as the fabric fibers are laid over and then treated with a water resistant film.

The inventors also had taber, scuff and deflection (drapeability) tests conducted by Spectro- coating Corporation. The test specimens were flocked woven substrates—one with erect flock fibers and the other with laid down flock fibers. The results were as follows:

For an H-18 1,000 gram weight used in a dry taber test (ASTM D-3884-92), the flocked woven substrate with laid down flock was 21.7% better in abrasion resistance than the flocked woven substrate with erect flock.

A scuff test revealed that in the warp direction, the flocked woven substrate with laid down flock was 24% better in scuff resistance than the flocked woven substrate with erect flock. In the fill direction, the flocked woven substrate with laid down flock tested 26.4% better in scuff resistance than the flocked woven substrate with erect substrate.

A deflection test revealed that at room temperature, the flocked woven substrate with laid down flock had better drapeability than the flocked woven substrate with erect flock by 14.2% in the warp direction and by 37.5% in the fill direction. At freezing temperatures of zero degrees Fahrenheit where cold flex adhesive is used, the drapeability was also better for flocked woven substrate with laid down flock by 3.5% in the warp direction and 29.4% in the fill direction as compared to that of the flocked woven substrate with erect flock.

The surface of the fabric of the present invention preferably should be smooth to readily accept print, offering a crisp image (e.g., to provide a realistic, life-like camouflage appearance for instance). Also, the fabric should be burr-retention resistant and capable of accepting a print on both the front and back of the fabric and be as lightweight as possible with the little bulk. The fabric should be quiet, soft and drapeable and should be capable of accepting and retaining a water repellant finish, a coating or lamination of breathable or non-breathable waterproof films, and an anti-bacterial finish to stop odor causing bacteria from proliferating. Further, the fabric should be washable and offer good wind and rain resistance.

Woven, knit or non-woven fabrics (without flock) were ruled out as candidates for satisfying this criteria because their faces have surface distortions which would adversely affect the realism of any print applied to their surface. Woven man-made filament fabrics definitely rustle or make noise while the wearer moves about. The plastic material of a poncho raincoat fits into the same category as a generally noisy material when worn.

By flocking with fibers of approximately 1.0 to 5 denier and fiber lengths of approximately 0.025 to 0.08 inches (or longer lengths) into an acrylic or polyurethane adhesive or other type of adhesive, a soft, quiet face is realized. The adhesive is applied to a soft, quiet and washable substrate such as a woven poly/cotton blend, 100% polyester, polypropylene or nylon. A finish is applied to this substrate that inhibits the growth of micro-organisms which cause body odor.

After the flocking process, the fabric is transfer printed upon which thermally sets the flock fibers directionally into a flattened state to provide a clean, clear, flat, substantially distortion-free surface. It is on this flat surface that dyes or inks on transfer paper are transferred to provide a desired pattern, such as a camouflage print.

By having fibers compressed directionally into a more solid mass, the fabric becomes more wind-resistant and water-resistant than the woven substrate itself. This compression and directional lay of the fiber also retards the ability of the fabric to pick up burrs, leaves, sticks, etc. This burr retention resistance is a significant attribute for an outdoor fabric because most outdoor fabrics will pick up burrs which renders them more noisy and the burrs that attach are generally pulled off individually since they cling or stick to the outdoor fabrics.

The look and feel of the fabric is dependent upon the choice of denier and length of the flock fibers. For fine fibers such as 1 to 2 denier and between 0.025 to 0.05 inch length, the resulting flocked fabric has a soft suede-like hand. For coarse fibers such as 3 to 5 denier and between 0.05 to 0.08 inch length, the resulting flocked fabric has a coarser, velour-like hand.

Further, the fabric of the invention is drapeable and lightweight with little bulk. The flocked woven fabric is more abrasion-resistant than flocked foam knitted fabrics or flock knits. Any conventional water repellent finish may then added to enhance the water-resistance afforded by the fabric.

Polyester would be selected over polycotton blends as the fabric substrate for those applications which call for better moisture permeability of the substrate; cotton is an absorber of moisture. Such moisture permeability is a desirable characteristic for outerwear apparel for hunters.

Although the preferred embodiment includes the substrate being made of either a polycotton blend, polyester or polypropylene, other types of woven fabrics and blends which are as quiet are as suitable. Such woven fabrics are soft, rather than rough, to the touch, and preferably brushed. The flocked woven fabric in accordance with the invention will be somewhat quieter than brushed woven, non-brushed woven or knitted fabrics alone because of the compressed flock, which has no ridges on which to scratch against bushes, trees or itself unlike the cross yarns of brushed woven, non-brushed woven or knitted fabrics.

Also, for applications calling for moisture permeability in outerwear, the present invention includes such fabrics which are also as moisture permeable as polyester, which is an ideal candidate for lamination to a breathable film to render the fabric wind-resistant and waterproof. In all cases, the quiet substrate selected is flocked and its fibers thermally set into a directional flattened state so as to provide a substantially distortion-free surface for transfer printing thereon.

Surprisingly, the flocked woven fabric of the invention is reversible. That is, both the front and back may be printed upon without the colors bleeding through to affect the appearance of the other side. It seems the adhesive, which is applied twice during the flocking process, serves as an effective barrier against color bleeding from one side to the other.

Such reversibility in lightweight outerwear is commercially important in the hunting trade. If the front and back have their own different camouflage pattern printed on, one pattern could be for spring or fall and the other pattern for winter so that the outerwear is suitable for matching the terrain in multiple seasons. If the front has a camouflage pattern and the back has a bright orange color, hunters will appreciate the ability to walk in and out of the woods with the orange color facing out for safety and reverse it so as to blend into the surrounding foliage with the camouflage print facing out after they arrive at the hunting area. As a consequence of the adhesive blocking the bleeding through of colors in the printed pattern to the opposite side, the lightweight outerwear of the invention is rendered reversible so that the conventional method of sewing together two fabrics to attain reversibility (at a higher cost and with much more bulk) is avoided.

Figure 4:
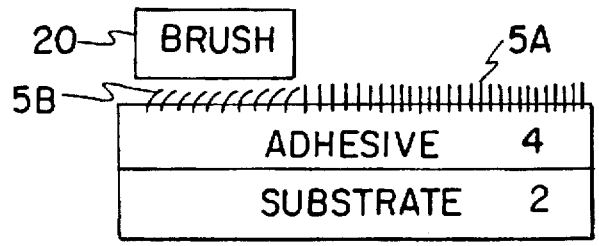
FIG. 4 is a schematic view of laid down flock being brushed to stand upright.

As shown in FIG. 4, after the flocked woven fabric has been transfer printed, the flock may be brushed in a conventional manner with a brush 20 so that the flock stands up 5A rather than remain in a laid down or flattened state 5B. Brushing will change the feel and the look of the fabric to some extent, but it will still have the benefit of having been transfer printed upon so that vivid colors in the print will still be apparent.

As shown in FIG. 5, the film 8 of FIG. 2 need not be applied directly to the substrate 2 where the substrate itself is sufficiently stabilized for the adhesive 4. If desired, the film 8 may be applied instead to a conventional lining 7, which in turn is arranged next to the substrate or perhaps separated from the substrate by an air space 9. Where the film 8 is applied to the lining 7, it need not be applied on the substrate 2. The film may be breathable or non-breathable and may be applied by spraying or using other conventional applying techniques to secure the film to the substrate 2 or lining 7 as desired. Some examples of films that may be laminated onto the back of the substrate or lining include vinyl, polyurethane and a space fabric.

For safety purposes, it may be desirable to color the outerwear a bright fluorescent orange and yet have the flock stand upright. In accordance with the invention, this may be attained by performing the steps of flock fiber flattening, printing on the flattened flock and then brushing up the flattened flock.

As an alternative, these steps may be substituted by dyeing at least the adhesive and flock with a bright fluorescent orange either before or after the flock is adhered to the substrate. The flock fibers are not set into a flattened state but remain standing upright. The woven substrate itself may also be dyed the same color.

In either case, the outerwear becomes strikingly visible and easily distinguishable visually from the surrounding outdoor natural environment. Outerwear colored in such a manner may be used by hunters, police, cross-walk guards, etc., i.e., in situations where high visibility is important for safety reasons and where striking contrast with the surrounding environment is essential. That is, the wearer does not want the color of the outerwear to blend in with the environment when seen by other observers.

Of course, the color selected for dyeing the outerwear may be any highly visible color, such as bright red, green, yellow, blue, pink, etc., or any mixture thereof. A more intense color contrast is attained with the use of fluorescent colors. By dyeing both the flock and the adhesive a common color, the color intensity of the fabric when viewed from a distance is greater than would be the case if just the adhesive and substrate were dyed. This difference is attributed to the reflective properties of the flock fibers. By matching the color of the dyed adhesive, the dyed flock fibers enhance the overall color intensity due to their added surface area and do not detract from or dilute the color intensity effect as would be the case if the flock were left undyed or dyed a different color.

FIG. 6 shows a Teflon™ coating 20 added as a water repellent finish to provide enhanced water resistance, preferably by immersing the fabric into the Teflon™ coating.

While the Teflon™ coating is shown on both the outer facing side (on the printed flock) and the inner facing side of the substrate, sufficient water resistance is attained if it is only on the outer facing side. The flock 5, of course, is flattened in a laid down condition to receive the printed layer 6 and the teflon coating 20 is applied to the flat surface. The adhesive 4 is in a cured condition. A pre-coat adhesive 21 fills the interstices of the woven or stabilized knit serving as the substrate and may or may not be present in the other embodiments. The pre-coat adhesive 24 and adhesive 4 may be combined as part of a single pass to both fill the interstices and adhere the flock.

One advantage of the construction of FIG. 6 is in water repellency. Applying the Teflon™ coating 20 directly to a woven substrate (without laid down flock) will not be as effective in keeping the substrate dry as where it is applied to a laid down flock layer that is adhered to the substrate. Indeed, the FIG. 6 construction is capable of passing industry storm tests even though it lacks the waterproof film 8 of FIG. 2. This performance in avoiding wet-out was particularly surprising to the inventors because usually a waterproof film is necessary in addition to Teflon™ coating for a fabric to pass the storm test.

It appears that, by applying such a waterproof film to the back side of the flattened flocked woven fabric of the present invention that such a film will have a longer life because it won't become as readily saturated when the fabric becomes wet.

To improve breathability, mechanical perforations may be made in the woven fabric before the flock is flattened into its laid down condition. While the dimension and concentration of such mechanical perforations within a given area of the fabric may be somewhat arbitrary, bear in mind that the greater the concentration the better the breathability. The hole size should approximate that of a needle diameter of conventional size in fabric manufacture. Obviously, the concentration of mechanical perforations should not be so large as to destroy the integrity of the fabric.

A warp knit, for instance, is stable in the warp direction but not in the filling direction. A warp knit arises from feeding yarn from a spool through knitting machine in one direction with the ends fed through needles in an up and down as opposed to a circular direction as would be the case for a circular knit. The warp knit may become stabilized in the filling direction through stitching. In so doing, it becomes transformed into a stabilized knitted fabric and may be used as a substitute for woven fabrics in accordance with the invention because it is stable in both the warp and filling directions. Of course, the knit would have to be of a construction that allows the adhesive to close the interstices of the knit.

Therefore, the present invention envisions the use of woven fabrics and stabilized knitted fabrics, both of which may hereafter be referred to as stabilized fabrics. As such, they avoid stretching the adhesive by such an extent that would cause the adhesive to break apart or fall apart which could lead to flock fall out.

To the extent that adhesives are commercially available that retain their integrity and do not fall apart when the underlying substrate is flexed, i.e., the adhesive may have some level of inherent give and take to allow it to flex with the substrate, such a substrate is to be treated as a stabilized substrate within the meaning of the invention although the characteristics of the adhesive are primarily responsible for the stabilization of the fabric.

The invention also encompasses a knitted circular knit or fleece on one side and flock on the other side with a film in the middle. The film provides sufficient stability to permit flocking.

To enhance breathability, mechanical perforations may be made with a conventional needle insertion machine that moves needles into the flocked woven or stabilized knitted fabric. A 19 to 42 needle type is selected with the goal being to obtain a hole density of approximately 800 points per square inch or better; a 32 to 36 needle type is preferable. The lower the needle type number, the coarser the needle.

Washing the substrate for purposes of softening its harshness may make it acceptable for use as a stabilized woven fabric in accordance with the invention. Such washing may come about by hot water washing or by dyeing the substrate; in both cases the fabric is subjected to heated fluid that softens the substrate. In this regard, the same dye color as the color of the substrate should be used to ensure consistency of color shade when printing. For instance, an Osnaburg woven substrate may be softened in this manner.

An adhesive and flock is then applied; the adhesive stiffens the fabric. If softening is desired because the adhesive stiffened the fabric too much, the finished fabric can be washed.

Alternatively, the substrate may first be washed and then have adhesives placed on it, which tend to stiffen the fabric but it still remains soft. The fabric is then flocked and printed before water repellency is applied. Thereafter, the finished product (flock and print) is washed to get it softer.

The reason for making the fabric soft is to make it more quiet and drapeable is so it doesn't rustle as much. The washing involves using 100 degrees Fahrenheit water with a non-ionic detergent and then tumble dried. It may be washed for two minutes with the detergent and then rinsed with water for two minutes, followed by tumble dry for twenty to twenty-five minutes. The tumble drying helps to soften the fabric. This washing and tumbling drying technique may be applied to any stabilized substrate, whether woven or knit.

While the foregoing description and drawings represent the preferred embodiments of the present invention, it will be understood that various changes and modifications may be made without departing from the spirit and scope of the present invention.

What is claimed is:

1. A fabric, comprising:
a substrate selected from a group consisting of stabilized wovens and stabilized knits, flock fibers and an adhesive adhering said flock fibers to said substrate, said adhesive being in a dried and cured condition, said flock fibers having an embedded portion within said adhesive, a protruding portion protruding out of said adhesive and a bent portion between said embedded and protruding portions, said bent portion changing an angular orientation of the flock fibers, said protruding portion being in a flattened and laid down condition due to bending in said bent portion to provide an outwardly facing surface that is substantially flat in that said protruding portion is arranged to lie on at least one of said adhesive and neighboring ones of said flock fibers so as to increase both abrasion resistance and burr retention resistance over that for the flock in an erect condition, said flock fibers having a memory that tends to return said protruding portion to said flattened and laid down condition instead of said erect condition.

2. A fabric as in claim 1, further comprising a printed layer on said substantially flat surface.

3. A fabric as in claim 1, wherein said substrate is configured into a garment having a pile direction of the flock fibers that is predominantly in one direction so that the flock fibers feel smoother when rubbed in the predominantly one direction than in a direction opposite thereto.

4. A fabric as in claim 1, further comprising a water repellent finish on said substantially flat surface.

5. A fabric as in claim 1, wherein said substrate has mechanical perforations that are open that enhance breathability.

6. A fabric as in claim 1, wherein a portion of the flock fibers are brushed to stand upright.

7. A fabric as in claim 1, wherein said substrate is in a softened condition.

8. A fabric as in claim 7, wherein the softened condition is free of stiffness that gives rise to a rustling noise when rubbed against itself.

9. A fabric as in claim 1, wherein said adhesive has a composition that maintains flexibility even when exposed to outdoor subfreezing environmental temperatures, said fabric having a drapeability that is greater with said flock fibers in said flattened and laid down condition adhered by said adhesive than with said flock fibers in said erect condition adhered by said adhesive.

10. A fabric as in claim 1, wherein said substrate has interstices, further comprising a cured adhesive filling said interstices; and a water-repellant finish supported by said substantially flat surface.

11. A fabric as in claim 10, wherein a printed layer is interposed between said water-repellant finish and said substantially flat surface.

12. A fabric as in claim 1, wherein said adhesive is in an aerated condition to provide a faster rate of water vapor transfer than for a condition where said adhesive is free of aeration.

13. A fabric as in claim 1, wherein said adhesive is free from being in an aerated condition to provide less drape and better abrasion resistance than for an aerated condition.

14. A fabric, comprising:
a substrate selected from a group consisting of stabilized wovens and stabilized knits;
a cured adhesive on said substrate;
a plurality of flock fibers protruding from said adhesive in a laid down condition on at least one of said adhesive and neighboring flock fibers, said fibers each having an embedded portion within said adhesive, a protruding portion in said laid down condition, and a bent portion between said embedded and protruding portions, said bent portion changing an angular orientation of the flock fibers, the fabric having:
  (a) a level of abrasion resistance sufficient to resist abrading into pieces from machine washing that softens the fabric;
  (b) a level of water penetration resistance sufficient to block water from penetrating through to the substrate to saturate the same;
  (c) a level of water penetration resistance sufficient to withstand water penetration by a column of water that is over twice a height of that to which the fabric may withstand penetration of water with the flock fibers in a erect condition prior to being put into the laid down condition; and
  (d) a level of drape that is higher with the flock fibers being laid down than with the flock fibers standing in an erect condition prior to being laid down.

15. A fabric as in claim 14, wherein said adhesive is aerated to provide better water vapor transfer than for a condition where said adhesive is free of aeration.

16. A fabric as in claim 14, wherein said adhesive is free from being in an aerated condition to provide less drape and better abrasion resistance than for an aerated condition.

* * * * *